United States Patent

Foster et al.

[11] Patent Number: 6,054,672
[45] Date of Patent: Apr. 25, 2000

[54] LASER WELDING SUPERALLOY ARTICLES

[75] Inventors: Michael F. Foster; Kevin J. Updègrove; Christopher A. Thurston; Dan L. Lovelace, all of Carson City, Nev.

[73] Assignee: Chromalloy Gas Turbine Corporation, San Antonio, Tex.

[21] Appl. No.: 09/153,477

[22] Filed: Sep. 15, 1998

[51] Int. Cl.[7] .................................................. B23K 26/00
[52] U.S. Cl. .................... 219/121.66; 148/525; 219/76.1
[58] Field of Search ....................... 219/121.66, 121.65, 219/121.63, 121.64, 76.1, 121.85; 148/525

[56] References Cited

U.S. PATENT DOCUMENTS

| | | | |
|---|---|---|---|
| 4,804,815 | 2/1989 | Everett | 219/121.8 |
| 5,106,010 | 4/1992 | Stueber et al. | 228/232 |
| 5,374,319 | 12/1994 | Stueber et al. | 148/404 |
| 5,554,837 | 9/1996 | Goodwater et al. | 219/121.63 |
| 5,900,170 | 5/1999 | Marcin, Jr. et al. | 219/121.66 |
| 5,914,059 | 6/1999 | Marcin, Jr. et al. | 219/121.66 |

*Primary Examiner*—Geoffrey S. Evans
*Attorney, Agent, or Firm*—Mitchell D. Bittman

[57] ABSTRACT

A process is provided for laser welding a nickel or cobalt based superalloy article to minimize cracking by preheating the entire weld area to a ductile temperature, maintaining such temperature during welding and solidification of the weld, with the welding utilizing a powder alloy feed and the speed of the laser controlled to less than 10 inches per minute.

11 Claims, 1 Drawing Sheet

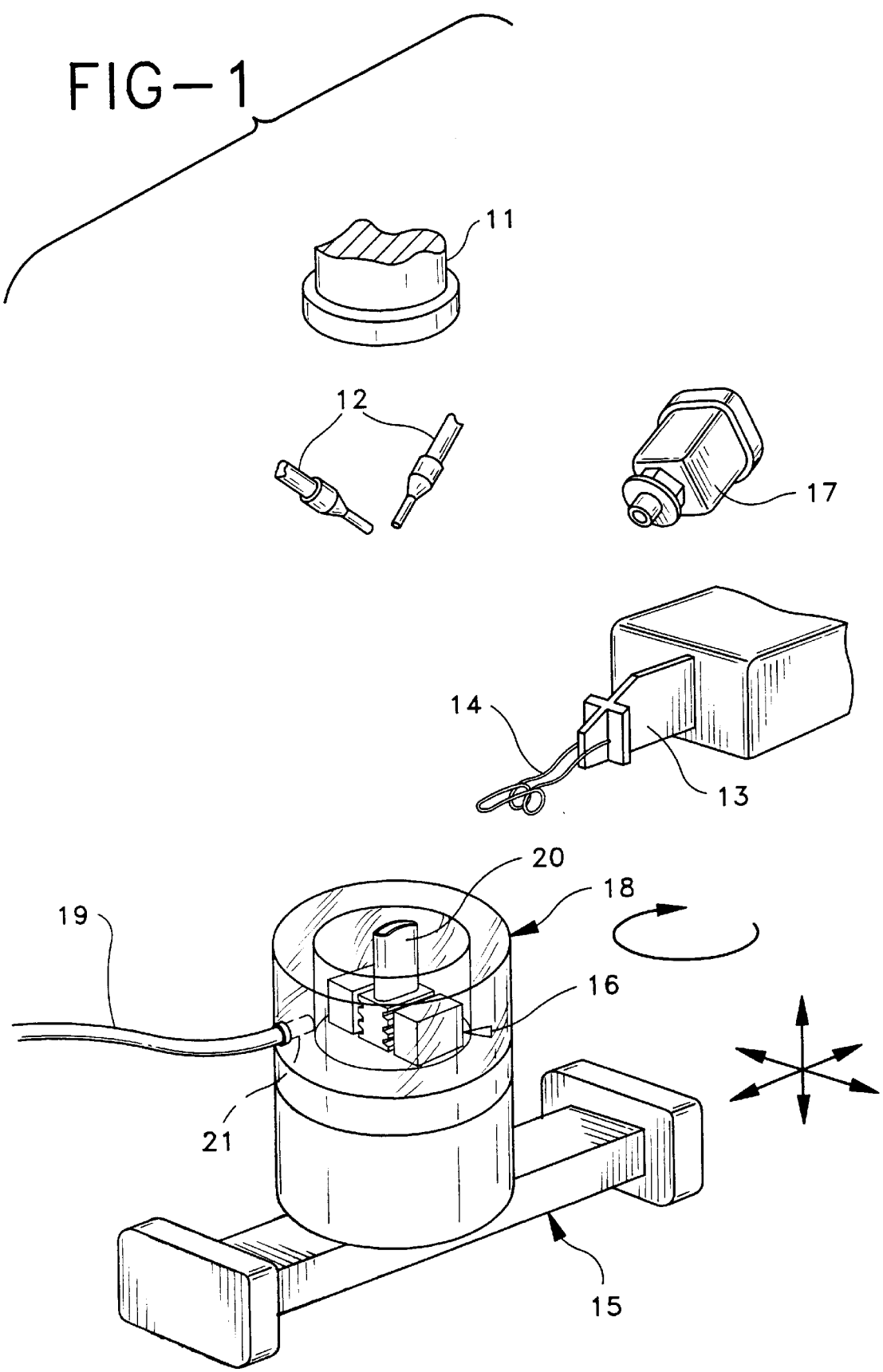

LASER WELDING SUPERALLOY ARTICLES

The present invention relates to a process for welding superalloy articles which are difficult to weld, and more particularly to a process for laser welding such articles.

As jet engine components are developed there is a continuing demand for improved capability to withstand increasingly higher temperatures due to the high temperature demands placed upon these components in the engine. Today's high pressure turbine blades and vanes are subjected to extremely adverse high temperature conditions (e.g. greater than 2000° F.). These jet engine parts may require welding processes during the manufacture of the components, or after seeing engine operations and require repair as a result of wear and cracking.

As a result of these high temperature demands these components often are manufactured from superalloys containing a gamma-prime phase and materials commonly known as the MCrAlY family of alloys. One particular problem with the gamma-prime precipitation hardenable alloys such as R'80 is the inability to weld or clad these alloys with like or similar alloys without encountering cracking and high production rejects.

Because of the welding temperatures and stresses involved, these alloys encounter shrinkage, stress cracking and the like. Due to the difficulties in welding these specific superalloys, there is a need for a process by which gamma-prime precipitation hardened alloys can be welded consistently without cracking with similar or parent metal alloys. U.S. Pat. Nos. 5,106,010 and 5,374,319 disclose such a process which preheats the weld area and region adjacent to the weld area to a ductile temperature and maintains such temperature during welding and solidification. U.S. Pat. No. 5,554,837 discloses carrying out an interactive laser welding process to maximize reproduceability and minimize rejects and waste while increasing throughput of welded components. While these processes minimize cracking in many alloys, there are particular problems associated with welding directionally solidified (DS) versions of these alloys wherein micro-crack formulation at grain boundaries is observed.

SUMMARY OF THE INVENTION

Briefly, this invention provides a process for laser welding a nickel and/or cobalt based superalloy article having a gamma prime phase comprising preheating the entire weld area and region adjacent to the weld area of the article to a ductile temperature within the range of 1400° F. to 2100° F. and maintaining such temperature during welding and solidification of the weld; and welding the preheated article utilizing a laser with a powder alloy feed, with the speed of the laser controlled to less than 10 inches per minute, preferably less than about 5 inches per minute, to minimize cracking at grain boundaries.

DETAILED DESCRIPTION OF THE INVENTION

This invention provides a process for welding superalloy articles, particularly gas turbine engine components including blades, vanes and rotors. The superalloys are nickel and/or cobalt based superalloys which are difficult to weld by state-of-the-art processes. These superalloys have a gamma-prime phase and include directionally solidified and single crystal alloys of gamma-prime nickel base precipitation hardened alloys. Generally, the gamma-prime precipitation-strengthened superalloys contain titanium and aluminum in a combined amount of at least about 5%. Suitable superalloys include R'80, DSR'80h, R'108, IN 738, R'125, DSR'142, R'N4, R'N5 Mar-M-247DS, In 792Hf, and CMSX-4. The nominal composition of some of these superalloys is described in U.S. Pat. No. 5,554,837, the disclosure of this patent being incorporated by reference.

In the directionally solidified (DS) alloys there are trace elements added as grain boundary strengtheners. The grain boundary strengtheners typically consist of carbides and borides, often tungsten and tantalum. When laser welding these alloys using typical procedures there is a consistent problem with micro-crack formation at the grain boundaries. The metallurgical composition of the grain boundaries is such that they melt at a lower temperature than the remainder of the base material. If the grain boundaries then cool too rapidly they fracture. Metallurgical evaluation of weld samples has shown that parts welded using typical CO2 laser parameters suffer micro-cracks at the grain boundaries. In some cases the micro-cracks remain small. In others, they tear open and can progress completely through the new weld. Larger cracks can often be individually repaired. However, experience has shown that the more often welding is attempted on a specific part, the greater the probability of generating additional cracks. The increased probability of cracks is caused by the initial laser weld procedure, which generates micro-cracks at the grain boundaries. Even if the micro-cracks do not initially propagate, they remain present as crack initiation sites with a very high likelihood of enlarging during subsequent weld or heat treatment operations.

A critical parameter in controlling the generation of micro-cracks when welding the DS alloys is the rate of resolidification of the base alloy. When laser welding, that rate is controlled by the traverse speed of the laser beam. The traverse speeds most commonly used are in the range of 10 to 30 inches per minute, with 18 ipm being typical. Speeds in this range have been thought necessary to take advantage of the low overall heat input allowed by the laser weld system. Conventional practice held that the best way to minimize cracks on all superalloys was to closely control the size of the weld puddle and minimize the depth of the weld penetration along with the associated heat affected zone. When laser welding DS superalloys, the depth of weld penetration and the extent of the heat affected zone do not affect the generation of micro-cracks on the grain boundaries. The micro-cracks are caused when the grain boundaries solidify so quickly that residual tensile stresses exceed the yield strength of the alloy in those locations. Increasing the preheat temperature helps reduce large tears, but micro-cracks can still be generated. Laser weld speeds less than 10 inches per minute (ipm), preferably less than about 5 ipm with 2 to 4 ipm being optimal, result in a weld process which minimizes or is free from micro-cracks. This preferred weld speed is almost one order of magnitude below the typical 18 ipm commonly used. As a result, other related weld parameters must be adjusted accordingly. In particular, overall laser power along with the grams per minute flow rate of filler powder must be reduced. The power must be significantly lower to prevent meltdown of the part being welded and the powder flow must be reduced to prevent excess weld porosity.

A suitable process for welding the superalloy is described in U.S. Pat. No. 5,554,837. FIG. 1 illustrates a laser welding system useful for carrying out the invention in which the components are not engaged, the apparatus is comprised of a laser 11 with a powder feed 12, an induction heater 13 with its induction heating coil 14 and a motion system 15 on which the article 20 is fixtured. The article (a turbine blade is shown) is fixtured by mounting on a stage 16 in a very precise manner utilizing a clamp, as is conventional. A pyrometer 17 and an inert gas shroud (shield) 18 with an inert gas feed line 19 and gas diffuser 21 are also shown. The superalloy article (e.g. a vane or blade) is preheated by an induction heating coil. During this preheating stage the entire weld area of the superalloy article and region adjacent to the weld area is heated by the induction heating coil to a ductile temperature within the range of 1400° F. to 2100° F., preferably 1725° F. to 1975° F. The ductile temperature to which the weld area of the article is heated is above the aging or precipitation hardening temperature, but below the incipient melting temperature of the particular superalloy article substrate. Critical to this process is to maintain thermal equilibrium before, during and after the welding/cladding process, leading to less severe thermal gradients across the weld/adjacent base metal thus reducing residual stresses and subsequent cracking. The reduction of thermal gradients lessens the impact of the heat from welding on the heat affected zone, i.e. the process "relocates" the heat affected zone away from the fusion line. Since the entire weld area and adjacent region is preheated above the precipitation hardening temperature, this results in a uniform thermal distribution that precludes the contraction and resultant residual stresses that are normally focused at the weaker heat affected zone. The entire weld area and adjacent region undergoes thermal contraction as a result of the aging reaction with the residual stresses that result from this reaction being distributed over a much larger area, not only concentrated in the spot being welded.

The entire weld area and region adjacent to the weld are heated, by induction heating, to the ductile temperature. The region adjacent to the weld area being heated is at least sufficiently large to be able to encompass the heat affected zone, preferably larger. The heat affected zone is defined as that portion of the base metal which has not been melted, but whose mechanical properties or microstructure have been altered by the heat of welding (see Metals Handbook Ninth Edition, Volume 6, ASM, 1983). Generally this adjacent region being heated is at least 0.25 inches preferably 0.5 to 1 inch from the weld.

Once the article has been preheated to the desired temperature the laser and powder feed are engaged for welding. The radiation from the laser forms a small molten pool of the substrate as the powder from the powder feed is dispersed over the molten pool and welded (clad) to the part by the laser beam. The solidification process is precisely controlled by the radiation of the beam and the heating energy imparted by the induction coil and relative movement of the beam and the article to control the thermal and resulting strains and stresses to form a crack-free weld during and after the solidification process. During operation, the article weld area is shrouded in an inert gas (e.g. argon or helium) in order to minimize the oxidation and oxide contamination of the base superalloy and filler metal alloy powder during the heating and welding process.

The temperature of the weld area is controlled throughout the process in spite of added heat from the laser beam by using an optical pyrometer with feedback voltage loop (inferometer) controlling the induction heater. The part is preheated in the 1400° F. to 2100° F. range and remains in this range during welding and solidification despite localized laser heat input. In addition, the inferometer (feedback loop) controls the ramp up (heat up) rate prior to welding and the ramp down (cool down) once welding has been completed. This preheating process reduces stresses and cracking from welding and allows the base superalloy article to be laser welded (clad) with a powder alloy feed which also comprises a superalloy, i.e. a gamma-prime precipitation strengthened superalloy or an MCrAlY alloy where M is Ni and/or Co. Advantageously a powder alloy can be utilized which is substantially the same as the alloy of the superalloy article. The reduction of stresses and cracking therefrom is especially needed when welding a directionally solidified superalloy with a gamma prime strengthened powder alloy due to the susceptibility for cracking along grain boundaries.

Generally it is preferred to control the cooling to reduce stresses induced by uncontrolled cooling which can induce cracking.

The laser welding of the article is controlled through use of a computer numerical control (CNC) means which controls the laser, powder feed and motion system on which the article is fixtured. Extensive programming and parameter development corroborated by metallurgical analysis is required for a metallurgically sound fusion bond without cracks. The control means includes a vision system which digitizes the article configuration in order to drive the motion system holding the article beneath the focused laser beam and converged powder feed.

The control system permits efficient and economical operation of the process allowing a variety of complex configuration to be welded. The vision system which is employed sets a precise path for the laser welding system which is individualized for the weld area of the particular article being welded. This is accomplished with a computer numerical control utilizing a program for the article, but with the precise path set by the vision system. After the article is secured in its fixture, the height is checked to ascertain the build-up needed during welding (cladding). Then after setting the contrast of the weld area, the camera of the vision system views (i.e. takes a picture of) the weld area and digitizes its periphery by tracing the periphery with a plurality of points which are numerically converted providing a precise contoured path for the laser to follow for the specific weld area of the article. After the path is set, the article still in its fixture, is then placed onto the motion system of the laser welding apparatus wherein the path of the laser is precisely set for this article. Because the path is precisely set for the specific article, less waste occurs in the welding process and reduced machining (e.g. milling, grinding) is required subsequent thereto to remove excess weldment. As a particular advantage subsequent machining can also be precisely controlled by utilizing the same fixture and control parameters for the specific article as originally set by the vision system for the laser welding. This reduces requirements for subsequent measurement and control which increases the efficiency of the process.

The motion system whose path is set by the control system is at least a 3-axis, preferably a 4 or 5-axis motion system to provide the detailed motion required for various complex welding area surfaces. The 3-axis motion would be along the X, Y and Z directions, the 4-axis motion for more complex flat surfaces would combine X, Y and Z directions with rotation (see FIG. 1), while a 5-axis motion for contoured surfaces would combine X, Y and Z directions with rotation and tilt.

Suitable lasers include those known to those skilled in the art including a $CO_2$ laser. The power density of the laser may be between $10^5$ watts/in$^2$ and $10^7$ watts/in$^2$ with a beam spot size in the range of 0.040 to 0.150 inches. The powder alloy feed is operated to deliver a stream of alloy particles generally −120 to +400 mesh at a rate of 5 to 15 grams/min. With the reduced laser weld speeds of this invention preferably the laser power utilized is from $10^4$ to $10^6$ watts/in$^2$, and the powder alloy feed rate is from 2 to 6 grams per minute.

EXAMPLE 1

Test coupons made of directionally solidified Rene 142 material were cut to an approximate size of 1.0 inch long× 0.750 inch wide×0.040 inch thick. The nominal composition by weight of Rene 142 is AL 6.15%, Cr 6.80%, Co 7.50%, Mo 1.45%, W 4.90%, Ta 6.35%, Hf 1.45%, Re 2.80%, C 0.12%, Zr 0.022%, B 0.015%, and balance Ni. The grain structure was oriented perpendicular to the long axis of the coupon, so that welding on a long side would be representative of welding around the tip rail of a turbine blade. The blades were cycled through a high temperature vacuum stress relief cycle. They were then acid etched and processed through a high sensitivity fluorescent penetrant inspection (FPI), followed by a cleaning cycle. All of the initial operations were performed in order to approximate the alloy condition of a turbine blade ready for weld repair, with no pre-existing cracks. Utilizing the process set forth in U.S. Pat. No. 5,554,837 preheat temperature was set at 1550° F. Coupons were then welded at speeds ranging from 18 ipm down to 2 ipm. Weld powder flow rate was varied from 8.5 grams per minute down to 3.5 grams per minute. Laser power was varied from 1000 watts down to 125 watts at the weld puddle. After welding the coupons were put through another high temperature vacuum stress relief cycle. Etch and FPI were repeated, followed by metallurgical evaluation of each coupon.

The inspections performed after the final heat treatment indicated that all coupons welded at speeds over 10 ipm had cracks, often progressing from the base alloy completely through the weld. Coupons welded at speeds between 2 ipm and 4 ipm experienced no cracks or micro-cracks. Coupons welded at speeds between 6 ipm and 10 ipm experienced a number of cracks and micro-cracks, with the number and size of the indications increasing as the weld speed increased. The variations in weld powder flow rate and laser power affected the size and shape of the weld bead along with the depth of weld penetration and heat affected zone. There was no correlation between either of those two parameters and the size or number of cracks in the test coupons.

EXAMPLE II

CF6-80C2 Stage 1 HPT blades made of a directionally solidified Rene 142 material were welded. As part of the normal repair process the blades were sent through the initial high temperature vacuum stress relief cycle. Following that, all initial cracks were manually repaired by TIG welding. The blades were then sent through high sensitivity FPI and x-ray inspection to ensure that they were crack free prior to CO2 laser weld. At the $CO_2$ laser the blades were welded using the following parameters: weld speed 2 ipm, powder feed 3.5 grams per minute, 1550° F. preheat temperature, laser power 575 watts at the part. After weld the blades were ground to final length, belt/sanded to restore the external contour, and electro discharge machined to clean the tip pocket. After the mechanical finishing operations the blades were sent through final high temperature vacuum heat treatment, followed by etch, high sensitivity FPI, and x-ray inspection. No cracks were detected by the various inspections. Finally, the blades were subjected to destructive metallurgical evaluation. Again, no cracks or micro-cracks were detected.

What is claimed is:

1. A process for laser welding a nickel or cobalt based superalloy article chosen from the group consisting of a gamma-prime precipitation strengthened superalloy containing titanium and aluminum in a combined amount of at least 5% comprising:

preheating an entire weld area and region adjacent to the weld area of the article to a ductile temperature which is above an aging temperature and below an incipient melting temperature for said superalloy and within the range of 1400° F. to 2100° F. and maintaining such temperature during welding and solidification of a weld; and welding the preheated article utilizing a laser beam with a powder alloy feed, controlling the laser speed to less than 10 inches per minute.

2. Process of claim 1 wherein the superalloy article is directionally solidified.

3. Process of claim 2 further comprising machining the welded article.

4. Process of claim 2 wherein the laser beam speed is less than about 5 inches per minute.

5. Process of claim 4 wherein the laser power is from $10^4$ to $10^6$ watts/in$^2$.

6. Process of claim 5 wherein the powder alloy feed rate is from 2 to 6 grams per minute.

7. Process of claim 4 wherein the powder alloy is a gamma-prime precipitation-strengthened nickel base superalloy containing titanium and aluminum in a combined amount of at least 5% or an MCrAlY alloy wherein M is Ni or Co.

8. Process of claim 7 wherein the ductile temperature is in the range of 1725° F. to 1975° F.

9. Process of claim 7 wherein the superalloy article and the powder alloy comprise substantially the same alloy.

10. Process of claim 9 wherein the superalloy article is a component for a gas turbine engine.

11. Process of claim 10 wherein the article is a turbine blade, turbine vane or turbine rotor.

* * * * *